US009804972B2

(12) United States Patent
Benedict et al.

(10) Patent No.: US 9,804,972 B2
(45) Date of Patent: Oct. 31, 2017

(54) REGULATING MEMORY ACTIVATION RATES

(71) Applicant: Hewlett-Packard Enterprise Development LP, Houston, TX (US)

(72) Inventors: Melvin K. Benedict, Houston, TX (US); William James Walker, Houston, TX (US); Andrew C. Walton, Houston, TX (US)

(73) Assignee: Hewlett-Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/778,341

(22) PCT Filed: Mar. 28, 2013

(86) PCT No.: PCT/US2013/034243
§ 371 (c)(1),
(2) Date: Sep. 18, 2015

(87) PCT Pub. No.: WO2014/158154
PCT Pub. Date: Oct. 2, 2014

(65) Prior Publication Data
US 2016/0085691 A1    Mar. 24, 2016

(51) Int. Cl.
*G06F 12/123* (2016.01)
*G06F 12/0806* (2016.01)
(Continued)

(52) U.S. Cl.
CPC ........ *G06F 12/123* (2013.01); *G06F 12/0806* (2013.01); *G06F 12/0888* (2013.01);
(Continued)

(58) Field of Classification Search
CPC ............. G06F 12/0806; G06F 12/0888; G06F 12/0891; G06F 12/123; G06F 2212/1021;
(Continued)

(56) References Cited

U.S. PATENT DOCUMENTS 5,630,097 A * 5/1997 Orbits ..................... G06F 12/10
710/33
5,717,644 A 2/1998 Hadderman
(Continued)

FOREIGN PATENT DOCUMENTS

CN        1613064      5/2005
CN        102841856    12/2012
(Continued)

OTHER PUBLICATIONS

PCT; "Notification of Transmittal of the International Search Report and the Written Opinion of the International Searching Authority, or the Declaration"; cited in PCT/US2013/034243; dated Jan. 8, 2014.
(Continued)

*Primary Examiner* — Reginald Bragdon
*Assistant Examiner* — Aaron D Ho
(74) *Attorney, Agent, or Firm* — Trop, Pruner & Hu, P.C.

(57) ABSTRACT

Activation rates of memory locations associated with memory addresses are monitored. The activation rates of the memory locations associated with the memory addresses are regulated. The regulating of the activation rates of the memory locations associated with the memory addresses includes selectively updating a cache with the memory addresses based on the activation rates.

15 Claims, 3 Drawing Sheets

(51) Int. Cl.
*G06F 12/0888* (2016.01)
*G06F 12/0891* (2016.01)

(52) U.S. Cl.
CPC .. *G06F 12/0891* (2013.01); *G06F 2212/1021* (2013.01); *G06F 2212/1032* (2013.01); *G06F 2212/22* (2013.01); *G06F 2212/502* (2013.01); *G06F 2212/604* (2013.01); *G06F 2212/69* (2013.01)

(58) Field of Classification Search
CPC ......... G06F 2212/1032; G06F 2212/22; G06F 2212/502; G06F 2212/604; G06F 2212/69
USPC ...................................................... 711/136
See application file for complete search history.

(56) References Cited

U.S. PATENT DOCUMENTS

| | | | |
|---|---|---|---|
| 5,745,913 | A | 4/1998 | Pattin |
| 8,166,248 | B2* | 4/2012 | Provenzano ........ G06F 12/0888 |
| | | | 711/133 |
| 8,788,758 | B1* | 7/2014 | de la Iglesia ......... G06F 12/121 |
| | | | 711/136 |
| 2002/0065992 | A1* | 5/2002 | Chauvel .................. G06F 1/206 |
| | | | 711/141 |
| 2002/0087797 | A1* | 7/2002 | Adrangi .............. G06F 12/0888 |
| | | | 711/133 |
| 2009/0144492 | A1 | 6/2009 | Barth |
| 2009/0187713 | A1 | 7/2009 | Zedlewski |
| 2009/0319718 | A1 | 12/2009 | Aldworth |
| 2011/0307664 | A1 | 12/2011 | Paver |
| 2012/0191900 | A1 | 7/2012 | Kunimatsu |
| 2012/0246544 | A1 | 9/2012 | Resnick |
| 2012/0324172 | A1* | 12/2012 | Rabinovitch ......... G06F 12/121 |
| | | | 711/136 |
| 2014/0281110 | A1* | 9/2014 | Duluk, Jr. ............. G06F 13/404 |
| | | | 710/313 |

FOREIGN PATENT DOCUMENTS

| | | |
|---|---|---|
| EP | 0895162 | 2/1999 |
| KR | 20120100705 | 9/2012 |

OTHER PUBLICATIONS

Yoon, H.et al., A Row Buffer Locality-aware Caching Policy for Hybrid Memories, (Research Paper), Dec. 17, 2011.

\* cited by examiner

REGULATING MEMORY ACTIVATION RATES

BACKGROUND

Many real world analytics applications process massive datasets. For example, machine learning may be applied to a large dataset for purposes of allowing an online business to better position itself in the online marketplace. In this manner, the online business may receive revenue due to sales through its online catalog and/or through revenue generated by users clicking on ads that appear on the business's website. A large dataset describing this activity may be mined for purposes of understanding the desires and trends of online users.

DETAILED DESCRIPTION

Processing a massive dataset may be quite burdensome on a memory of a computer system due to a large number of potential repeated accesses to the same or nearby memory locations in connection with this processing. The repeated accesses may be at rates that are large enough to potentially affect the integrity of the data stored in the memory, if not for the systems and techniques that are disclosed herein.

More specifically, charges are selectively stored in the capacitor-based memory cells of a dynamic random access memory (DRAM) device to represent the corresponding stored data. Because leakage currents degrade the stored charges, the memory cells of the DRAM device are periodically refreshed, which involves reading the data stored in the DRAM's device memory cells and rewriting the data back to the memory cells. The rate at which the DRAM device is refreshed, however, may be insufficient to maintain the charge levels for certain activity. In this manner, for purposes of accessing a row of memory cells of a DRAM device, a command called an "activate command" may be issued to open the row for access. Repeated activation of a given row (activations on the order of thousands of times per refresh period, for example) at a high enough rate may degrade data stored in adjacent word lines (a natural occurrence in the DRAM due to the relatively close spacing of the DRAM features), even though these word lines are periodically refreshed. In other words, the periodic refresh intervals may be insufficient to maintain the stored data when the activation rates exceed a certain threshold.

For purposes of controlling the degradation that may otherwise occur due to repeated activations of a given row during a given refresh period, systems and techniques are disclosed herein, which use cache entries to store data content for frequently accessed DRAM rows.

More specifically, systems and techniques are disclosed herein for monitoring the activation rates for memory locations that correspond to a monitored pool of system addresses. This address pool, in turn, may contain a significantly larger number of addresses than the number of addresses that are targeted by the cache. The addresses targeted by the cache are updated based on the monitored activation rates for addresses of the pool. For example, if one of the monitored addresses in the pool has an associated activation rate that exceeds a predetermined refresh rate threshold, the cache may be updated to subsequently handle accesses to that memory location so that the refresh rate threshold to the memory location is thereafter not exceeded. Likewise, a memory location that was frequently accessed and is currently cached may be now less frequently accessed. For this case, the cache may be updated to evict, or remove, the entry that corresponds to the less frequently accessed memory location.

Figure 1:
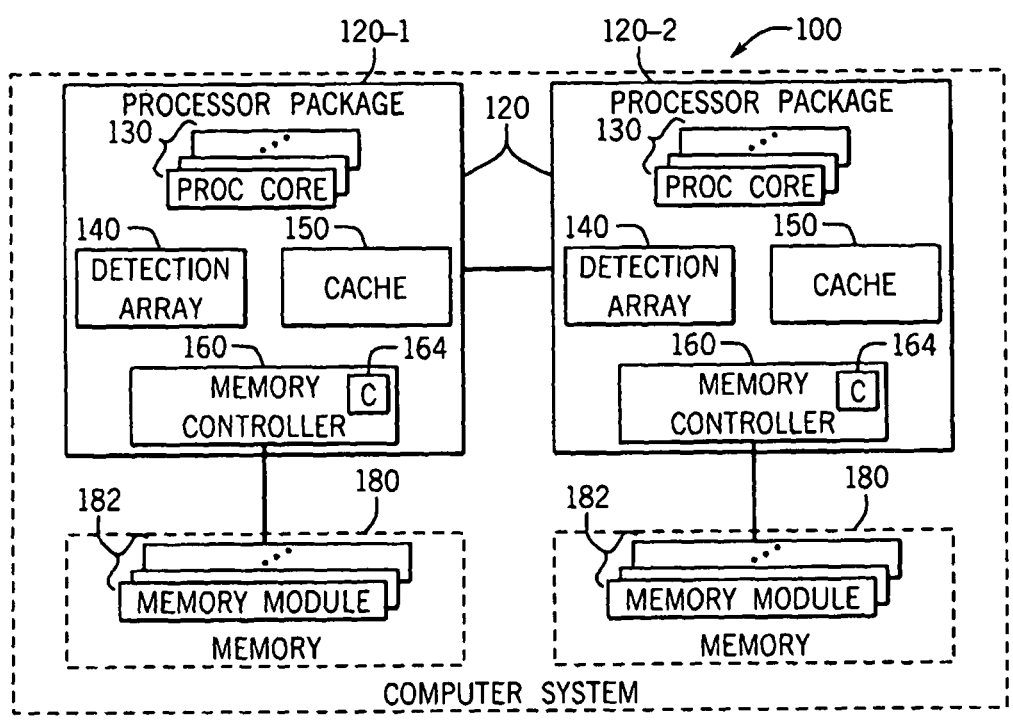
FIG. 1 is a schematic diagram of a computer system according to an example implementation.

As a more specific example, FIG. 1 depicts an example computer system 100. For this example, the computer system 100 includes processor packages 120 (two processor packages 120-1 and 120-2 being depicted in FIG. 1 as examples). In general, the processor package 120 may be a semiconductor package (a ball and grid package, for example), which includes one or multiple processor cores 130. In addition to the processor core(s) 130, the processor package 120 may include a memory controller 160, which, in general, controls the storing and retrieving data in memory modules 182 (dual inline memory modules (DIMMs), as examples), which collectively form a memory 180. As depicted in FIG. 1, in an example implementation, each processor package 120 may have an associated memory 180, which may serve, for example, as both a local and shared memory for the computer system 100. Other implementations are contemplated, which are within the scope of the appended claims.

In accordance with an example implementation, for purposes of limiting the rate at which any given location of the memory 180 may be activated, the processor package 120 includes a controller 164. It is noted that the controller 164 may be part of the memory controller 160 (as depicted as an example in FIG. 1) or may be separate from the memory controller 160. Moreover, the controller 164 may be implemented as part of the CPU package (i.e., implemented by the execution of machine executable instructions by a CPU); may be implemented using circuitry (one or multiple integrated circuits, for example) outside of a CPU package; or may be a combination of the above, depending on the particular implementation.

Regardless of its particular form, the controller 164 monitors transactions with the memory 180 for purposes of detecting when a memory location that corresponds to an address within a given pool of addresses is activated. The locations may include contiguous and/or non-contiguous locations of the memory 180, depending on the particular implementation.

For purposes of determining when a given address is within the pool of addresses, the controller 164 uses a detection array 140, in accordance with an example implementation. As an example, the detection array 140, in general, contains the most frequently activated addresses (the most frequently activated addresses associated with cache lines, for example) of the memory 180. In accordance with example implementations, the controller 164 controls which addresses belong in the pool. In this manner, in accordance with example implementations, the controller 164 selectively evicts and adds addresses to the fixed number pool (as an example) based on the observed activation rates for the addresses.

When a given address of the pool of addresses exceeds a predefined threshold (a threshold that coincides with a determined maximum number of activations per refresh period before memory degradation may occur, for example), the controller 164 takes corrective action for purposes of reducing the rate at which the associated memory location is accessed. In this manner, as further disclosed herein, the controller 164, in response to detecting that the activation rate for an associated address of the pool has been exceeded, updates a cache 150 to thereafter track the address, i.e., the controller 164 updates the corresponding cache tag address to target the address so that clean data associated with the address is stored in a line of the cache 150. By configuring the cache 150 to cache the frequently accessed memory address, the activation rate of the corresponding memory location is significantly reduced, as most accesses are served from the cache 150.

Figure 2:
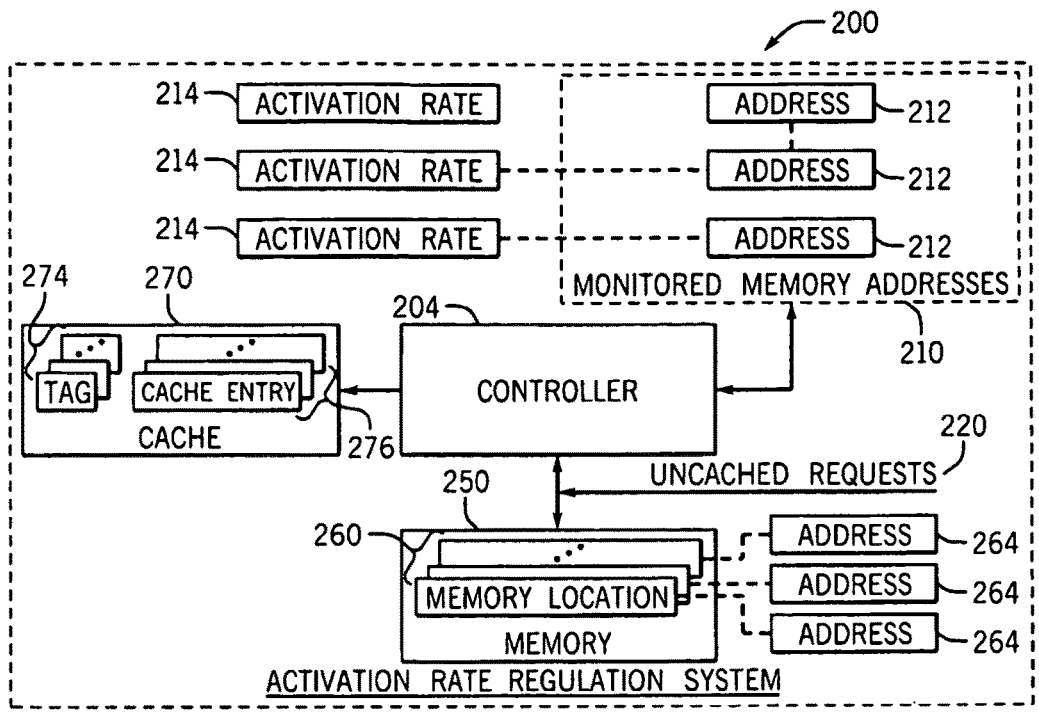
FIG. 2 is a schematic diagram of an activation rate regulation system of the computer system of FIG. 1 according to an example implementation.

Thus, referring to FIG. 2, in accordance with an example implementation, an activation rate regulation system 200 monitors requests 220 that are not cached by the controller 204, which may be, for example, requests that are communicated in memory bus operations and which may involve the communication of an activate command. The controller 204 compares the memory addresses associated with the request 220, which are associated with activate commands to a pool 210 of monitored addresses 212. In this manner, for the monitored addresses 212, the controller 204 maintains a log of the corresponding activation rates 214. Moreover, the controller 204 maintains which addresses 212 belong in the pool 210 so that, in general, the pool 210 contains the addresses 212 are the most frequently activated. In general, the memory 250 therefore includes memory locations 260 with corresponding addresses 264, with the most frequently activated addresses 264 corresponding to the tracked addresses 212 of the pool 210.

When a given activation rate 214 exceeds a predefined threshold, the controller 204 updates a cache 270 to evict one of the cache entries 276 of the cache 270 and replace the evicted cache entry 276 with a cache entry 276 that corresponds to the address 212 having the activation rate 214 that has been exceeded. For this purpose, the cache 270 may update a corresponding tag address entry 274, so that the cache 270 stores data for the new address 212.

Figure 3:
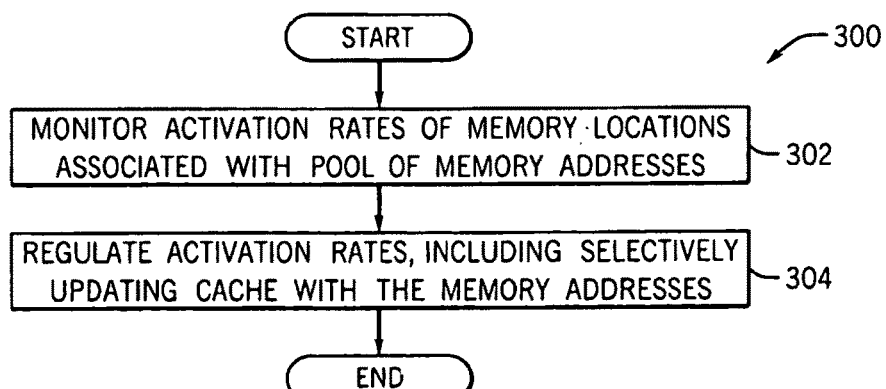
FIG. 3 is a flow diagram depicting a technique to regulate activation rates of a memory according to an example implementation.

Thus, referring to FIG. 3, a technique 300 in accordance with example implementations includes monitoring (block 302) activation rates of memory locations that are associated with a pool of memory addresses. The technique 300 includes regulating (block 304) activation rates, including selectively configuring cache-to-cache accesses to the memory addresses that are activated too frequently.

In general, the activation rate is lowered by caching addresses that are most frequently activated. For example, if the maximum activation rate is one million activates per refresh interval and problems occur at two hundred thousand activates per refresh interval, in accordance with an example implementation, the cache 270 contains cache entries for at least five addresses, i.e., 1 M/200K=5 addresses. In such a case, an application running on the system may access five addresses rapidly and not hit the memory 250. If the application hypothetically accesses six addresses rapidly, the memory 250 would get one in every six of the most frequent activates, and this would be at a rate that was low enough to not cause problems.

Figure 4:
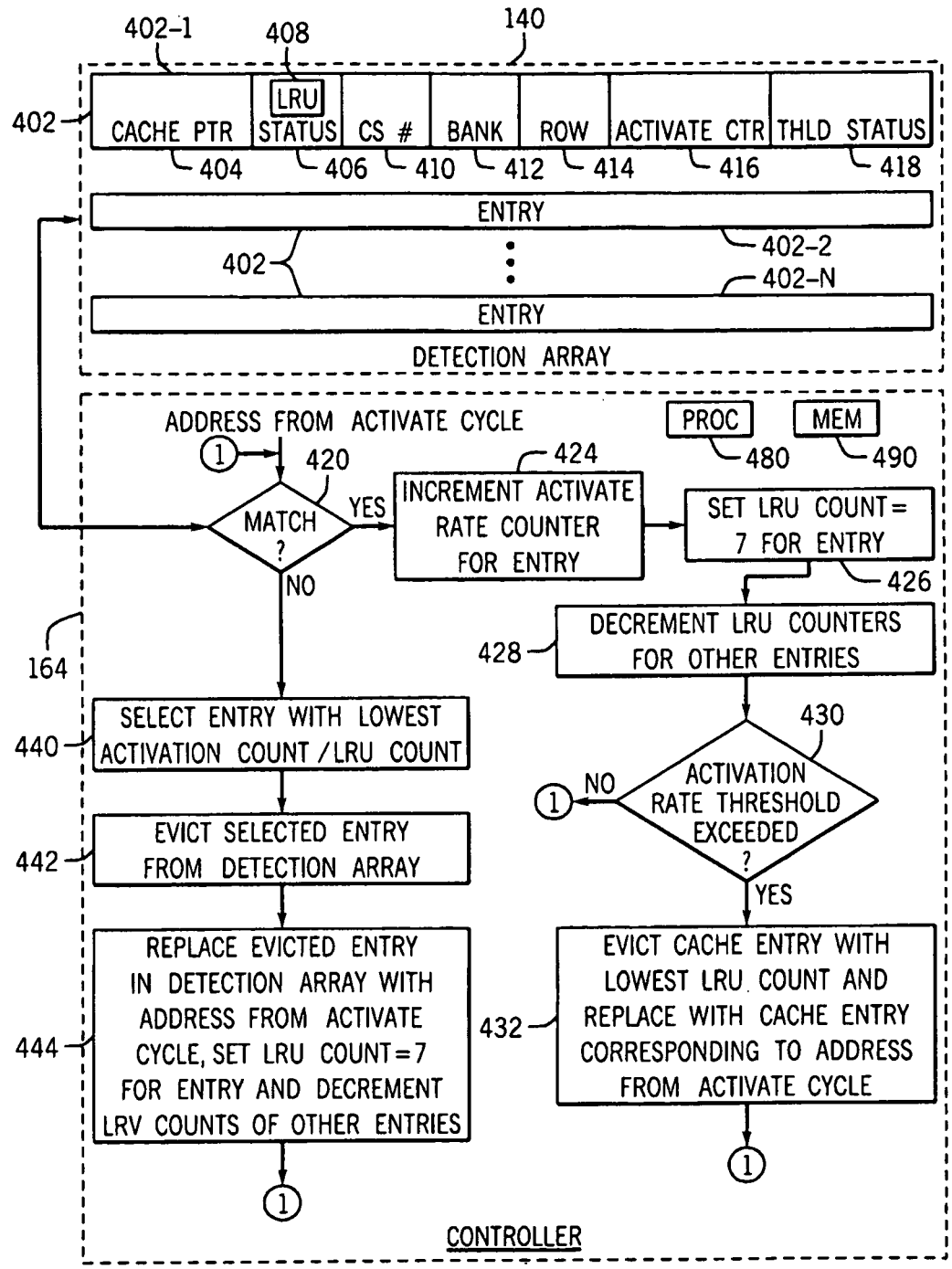
FIG. 4 is a schematic diagram illustrating interaction between a controller and a detection array of the computer system of FIG. 1 according to an example implementation.

Referring to FIG. 4, as a more specific example, in accordance with some implementations, the detection array 140 may include N entries 402 (N entries 402-1, 402-2 . . . 402-N, being depicted as examples in FIG. 4), which are associated with the pool of addresses being monitored. In accordance with an example implementation, the detection array may include sixteen entries 402, corresponding to the monitored addresses.

Each entry 402 may include the following fields, which are illustrated for example cache line 402-1 of FIG. 4. A cache entry pointer field 404 contains data to represent a potential pointer to a corresponding cache entry. A status field 406 contains data indicative whether the entry 402-1 is cached, as well as data 408 identifying a least recently used (LRU) count value for the entry 402. As discussed further herein, the LRU count value is used pursuant to a cache entry replacement policy that at least approximates an LRU replacement policy (in accordance with example implementations) for purposes of identifying the most frequently activated memory addresses. The fields of the entry 402 may further include fields that identify the specific address, such as a column select field 410, a bank identification field 412 and a row address field 414. Moreover, the entry 402 includes a field 416 that contains data to store an activation count value.

In this regard, the field 416 forms an activation counter, which is used and updated by the controller 164 for purposes of tracking activations for the associated address. When these activations exceed a threshold, the controller 164 then takes the appropriate actions to update the cache. For the specific example of FIG. 4, a threshold may be defined for each address. In this regard, in accordance with example implementations, the entry 402 contains a field 418 that contains data identifying a threshold status. When the count value indicated by the data in the field 416 exceeds the threshold value indicated by the data in the field 418, then the controller 164 deems that the activation rate for the corresponding address has been exceeded.

In accordance with example implementations, there may a single refresh interval counter that may be used to determine the refresh period. In this manner, in accordance with some implementations, any active chip select signal may be used as a source for the refresh. Other time intervals may be used, in accordance with further implementations. Regardless of the particular implementation, the activation counters (i.e., the count values indicated by the fields 416) are periodically reset.

Other implementations are contemplated, which are within the scope of the appended claims. In this manner, in accordance with further implementations, other ways may be used to decide which cache entry to replace. For example, in accordance with further example implementations, a cache entry may be randomly replaced with an entry that targets a new address that is being accessed too frequently. In further implementations, the oldest entry may be replaced based on a count value provided by an up counter. Other techniques may be used for purposes of deciding which cache entry to replace, in accordance with further implementations.

As depicted in FIG. 4, the controller 164 may perform the following actions on each activate cycle. In this manner, on each activate cycle, the controller 164 determines (decision block 420) whether the address from the activate cycle matches any of the addresses indicated by the entries 402 of the detection array 140. If so, the controller 164 increments (block 424) the activate rate counter for the entry and sets (block 426) the LRU count value 408 for the entry equal to "7," which for this example, is the maximum value for the counter. In other words, with this maximum LRU count value, the entry is now designated as being one of the most frequently accessed entries of the detection array 140. The controller 164 further decrements (block 428) the LRU counters for the other entries 402. Thus, as the detection array 140 is updated for each activation cycle, the non-accessed entries have LRU counts which are decremented, thereby allowing identification of the least recently used entries 402.

The controller 164 determines (decision block 430) whether the activation rate threshold has been exceeded. If so, the controller 164 communicates with the cache to evict (block 432) the cache entry having the lowest LRU count and replace it with the cache entry corresponding to the address from the current activate cycle.

If in decision block 420, the controller 164 determines that the address from the current activate cycle does not match any addresses corresponding the entries 402 of the detection array 140, then the controller 164 selects (block 440) the entry of the detection array that has the lowest activation count/LRU count. In this regard, for example, if two entries 402 have the same LRU count, then the controller 164 selects the candidate entry 402 that has the lower corresponding activation rate. The selected entry is then evicted, or removed, from the detection array 140, pursuant to block 442. The controller 164 replaces (block 444) the evicted entry in the detection array 140 with the address from the activate cycle, sets the LRU count equal to 7 for the entry and decrements the LRU counts for the other entries.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
periodically refreshing a plurality of memory locations of a dynamic random access memory (DRAM) device to maintain stored charges within the memory locations, the memory locations associated with a plurality of memory addresses;
monitoring activation rates of the memory locations, each activation rate associated with a row of the memory locations;
determining whether a monitored activation rate exceeds a threshold sufficient to cause degradation of data stored in adjacent rows to the row with which the monitored activation rate is associated, regardless of the periodic refreshing of the memory locations of the adjacent rows; and
in response to determining that the monitored activation rate exceeds the threshold, caching the memory addresses associated with the memory locations of the row with which the monitored activation rate is associated.

2. The method of claim 1, wherein monitoring the activation rates comprises:
maintaining an array having entries, each entry being associated with one of the memory addresses and having a counter to track the activation rate for the associated memory address, the maintaining comprising regulating which memory addresses of a second larger plurality of memory addresses are tracked by the array.

3. The method of claim 2, wherein regulating comprises, in response to a memory address being indicated in a transaction which is not being tracked by the array, evicting one of the entries of the array and replacing the evicted entry with a new entry corresponding to the memory address indicated in the transaction.

4. The method of claim 3, wherein evicting comprises selecting an entry from the entries for eviction corresponding to a memory address that has been less frequently accessed than at least one other memory address tracked by the array.

5. The method of claim 4, wherein evicting comprises applying a replacement policy in which a least recently used entry is replaced.

6. The method of claim 2, wherein regulating comprises, in response to a memory address being indicated in a bus transaction which is being tracked by the array, incrementing a counter of the associated entry to indicate more recent use of the indicated address.

7. The method of claim 1, wherein:
monitoring the activation rates comprises using counters associated with the plurality of memory addresses to track the activation rates;
determining when one of the counters exceeds a threshold indicating that an associated memory address of the plurality of memory addresses has exceeded an activation threshold; and
selectively updating the cache comprises evicting a cache entry and replacing the evicted cache entry with data associated with the memory address exceeding the activation threshold.

8. A system comprising:
a system memory comprising a dynamic random access memory (DRAM) device having a plurality of memory locations, the memory locations associated with a plurality of memory addresses;
a cache to a target a first set of the memory addresses; and
a controller to:
periodically refresh the memory locations of the DRAM device to maintain stored charges within the memory locations;
monitor activation rates of a second larger set of the memory addresses, each activation rate associated with a row of the memory locations;
determine whether a monitored activation rate exceeds a threshold sufficient to cause degradation of data stored in adjacent rows to the row with which the monitored activation rate is associated, regardless of the periodic refreshing of the memory locations of the adjacent rows; and
in response to determining that the monitored activation rate exceeds the threshold, update a composition of the first set targeted by the cache to include the memory addresses associated with the memory locations of the row with which the monitored activation rate is associated.

9. The system of claim 8, further comprising:
an array comprising entries, each entry being associated with a memory location of the second set and a counter to track an activation rate associated with the associated memory location,
wherein the controller is coupled to use the array to determine when to update the composition of the first set.

10. The system of claim 9, wherein the controller is further adapted to selectively update a composition of the second set of memory addresses based on how frequently the associated memory locations are accessed.

11. The system of claim 9, wherein at least one of the entries comprises a field to store data for a pointer to a corresponding entry of the cache and a field to store data indicative of a counter to track how frequently the associated memory location is accessed relative to the other memory locations being tracked by the array.

12. The system of claim 9, wherein at least one of the entries further comprises a field to indicate a threshold for a value indicated by the counter of the entry to identify when an activation rate threshold has been exceeded.

13. An article comprising a non-transitory storage medium to store instructions readable by a processor-based system which when executed by the processor-based system cause the processor-based system to:
    periodically refresh a plurality of memory locations of a dynamic random access memory (DRAM) device to maintain stored charges within the memory locations, the memory locations associated with a plurality of memory addresses;
    monitor activation rates of the memory locations, each activation rate associated with a row of the memory locations;
    determine whether a monitored activation rate exceeds a threshold sufficient to cause degradation of data stored in adjacent rows to the row with which the monitored activation rate is associated, regardless of the periodic refreshing of the memory locations of the adjacent rows; and
    in response to determining that the monitored activation rate exceeds the threshold, cache the memory addresses associated with the memory locations of the row with which the monitored activation rate is associated.

14. The article of claim 13, the storage medium storing instructions that when executed by the processor-based system cause the processor-based system to:
    maintain an array having entries, each entry being associated with one of the memory addresses and having a counter to track the activation rate for the associated memory address, the maintaining comprising regulating which memory addresses of a second larger plurality of memory addresses are tracked by the array.

15. The article of claim 13, wherein at least one of the memory locations comprises a cache line.

\* \* \* \* \*